(12) United States Patent
Yeates et al.

(10) Patent No.: US 10,916,227 B1
(45) Date of Patent: Feb. 9, 2021

(54) PERCUSSION INSTRUMENT STRIKE TRAINING APPLIQUE

(71) Applicants: John Arthur Yeates, Pleasant Hill, MO (US); Jamie Marie Haffner, Pleasant Hill, MO (US)

(72) Inventors: John Arthur Yeates, Pleasant Hill, MO (US); Jamie Marie Haffner, Pleasant Hill, MO (US)

(*) Notice: Subject to any disclaimer, the term of this patent is extended or adjusted under 35 U.S.C. 154(b) by 0 days.

(21) Appl. No.: 16/696,102

(22) Filed: Nov. 26, 2019

(51) Int. Cl.
*G10D 13/03* (2020.01)
*G09B 15/00* (2006.01)
*G10H 1/00* (2006.01)

(52) U.S. Cl.
CPC ............ *G10D 13/03* (2020.02); *G09B 15/00* (2013.01); *G10H 1/0008* (2013.01)

(58) Field of Classification Search
CPC ....... G10D 13/03; G09B 15/00; G10H 1/0008
See application file for complete search history.

(56) References Cited

U.S. PATENT DOCUMENTS

| | | | |
|---|---|---|---|
| 3,960,046 A | 6/1976 | Choong | |
| 6,031,172 A | 2/2000 | Papadopoulos | |
| 6,525,259 B2 | 2/2003 | Sagastegui | |
| 6,750,386 B2 | 6/2004 | King | |
| 6,930,235 B2 | 8/2005 | Sandborn et al. | |
| 7,202,406 B2 | 4/2007 | Coleman | |
| 7,271,328 B2 | 9/2007 | Pangrle | |
| 7,351,898 B2 | 4/2008 | Sagastegui | |
| 7,507,893 B2 | 3/2009 | Knudsen | |
| 7,880,076 B2 | 2/2011 | Lemons | |
| 8,158,869 B2 | 4/2012 | Charles | |
| 8,198,526 B2 | 6/2012 | Izen et al. | |
| 8,222,506 B1 | 7/2012 | Sardo | |
| 9,099,065 B2 | 8/2015 | Lillard | |
| 9,754,570 B2 | 9/2017 | Strachan | |
| 2016/0236054 A1* | 8/2016 | Johnson | A63B 69/004 |

* cited by examiner

Primary Examiner — Kimberly R Lockett

(57) ABSTRACT

A percussion instrument strike training applique is formed as a multi-layer removable sticker that covers a percussion instrument playing/striking zone. The multi-layer sticker has a detachable ink layer on a top surface of the applique that detaches when struck with a striking implement of the instrument. The detachment of the detachable ink layer from the striking surface of the instrument allows the percussion instrument players to assess their performance when they are not playing and are free to think critically and make adjustments.

12 Claims, 4 Drawing Sheets

PERCUSSION INSTRUMENT STRIKE TRAINING APPLIQUE

BACKGROUND OF THE INVENTION

The present invention relates to music instrument training, and more particularly to percussion instrument training devices.

All percussion instruments have an ideal playing zone that creates a characteristic sound quality. For the novice player, striking consistently and accurately within the ideal playing zone can be difficult because of the lack of sustained visual feedback.

For proper feedback, direct in-the-moment observation of striking zones must happen during the act of playing. However, this can be difficult for the novice, while their brain is busy assessing and accomplishing many complicated tasks.

As can be seen, there is a need for an improved percussion instrument strike training device that allows novice musicians to assess their performance when they are not playing and are free to think critically and make adjustments to their strike technique.

SUMMARY OF THE INVENTION

In one aspect of the present invention, a percussion instrument strike training applique is disclosed. The percussion instrument strike training applique includes a substrate layer. A permanent ink layer is removably adhered to a surface of the substrate layer. The permanent ink layer is dimensioned to a strike surface of a percussion instrument. A detachable ink layer is applied to a top surface of the permanent ink layer. The detachable ink layer is dimensioned to a desired strike zone of the percussion instrument. The detachable ink layer is separable from the permanent ink layer when struck by a striking implement of the percussion instrument to provide a visual indicia of an implement strike within the desired strike zone.

In some embodiments, an adhesive is applied to a bottom surface of the permanent ink layer. The adhesive is releasable from each of the substrate layer and a striking surface of the percussion instrument. Alternatively, the permanent ink layer is formed of a self-adhering plastic film.

In other embodiments, permanent ink layer and the detachable ink layer are of contrasting colors.

In other embodiments, the detachable ink layer also includes one or more target zones surrounding the desired strike zone. The one or more target zones may include one or more concentric rings surrounding the desired strike zone.

In other embodiments, one or more tabs protrude from an edge of the permanent ink layer. The one or more tabs are provided to facilitate removal of the permanent ink layer from each of the substrate and the striking surface of the percussion instrument.

In yet other embodiments, the percussion instrument strike training applique may also include one or more replacement patches dimensioned to cover the desired strike zone.

In a preferred embodiment, the percussion instrument is a drum.

In other aspects of the invention, a percussion instrument strike training applique includes a permanent ink layer film removably adhered to a surface of a substrate. The permanent ink layer is dimensioned to a strike surface of a percussion instrument. A detachable ink layer is applied to a first surface of the permanent ink layer. The detachable ink layer is dimensioned to a desired strike zone of the percussion instrument. The detachable ink layer is separable from the permanent ink layer when struck by a striking implement of the percussion instrument.

Other aspects of the invention include a method for training a strike technique for playing a percussion instrument. The method includes applying a percussion instrument strike training applique to a striking surface of the percussion instrument. The percussion strike training applique includes a permanent ink layer that is removably adhered to the striking surface. A detachable ink layer is applied to a first surface of the permanent ink layer. The detachable ink layer is dimensioned to a desired strike zone of the percussion instrument. The method includes striking the instrument with a striking implement of the percussion instrument.

In other embodiments, the method includes observing a detachment of the detachable ink layer. The detachment is produced by an impact of the striking implement within the detachable ink layer.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provide a replaceable striking surface indicator for percussion instruments, such as drums. All percussion instruments have an ideal playing zone that creates a characteristic sound quality. For the novice player, striking consistently and accurately within the ideal playing zone can be difficult because of the lack of sustained visual feedback.

As seen in reference to the drawings of FIGS. 1-7, a method and apparatus of strike training for a percussion instrument is shown. In a non-limiting embodiment of a percussion instrument strike training applique 10, is shown applied to a striking surface of a percussion instrument 14, such as a drum. The percussion instrument strike training applique 10 includes a detachable ink layer 12 carried on the striking surface of the drum. The detachable ink layer 12 is dimensioned to correspond to a desired strike zone of the percussion instrument 14. A striking implement 16 for the percussion instrument 14 may include a drumstick.

Figure 1A:
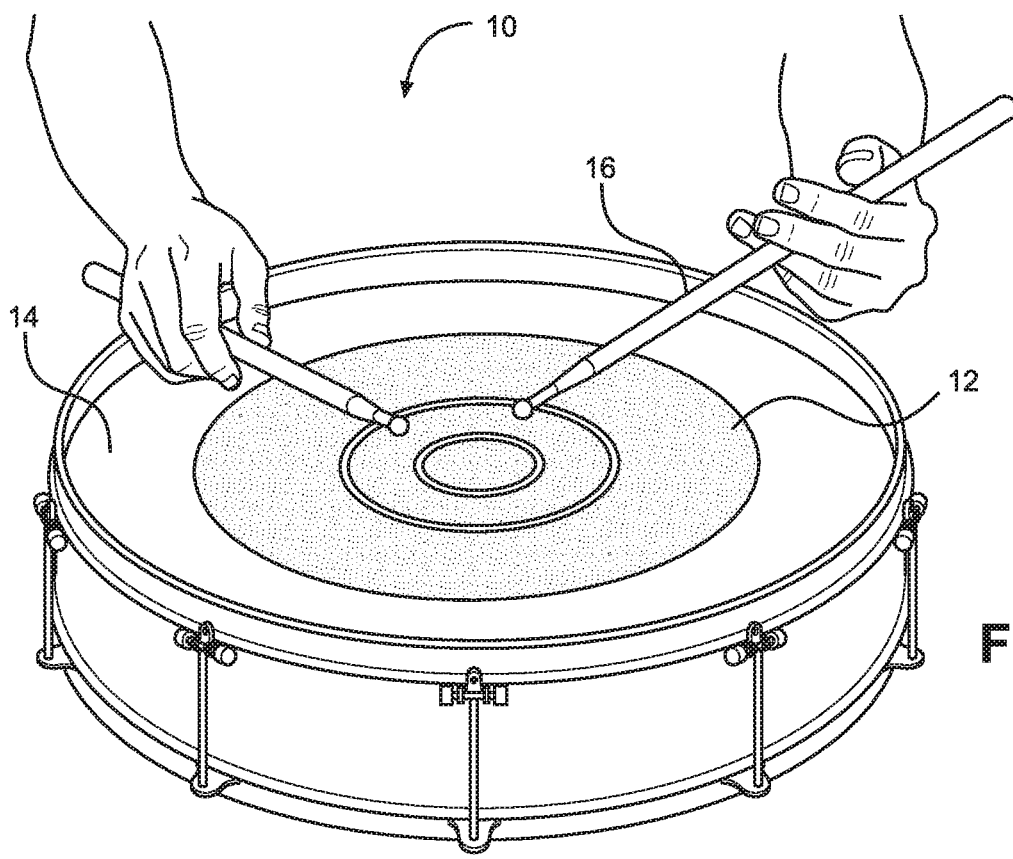
FIG. 1a is an in-use view of the percussion instrument strike training applique.
Figure 1B:
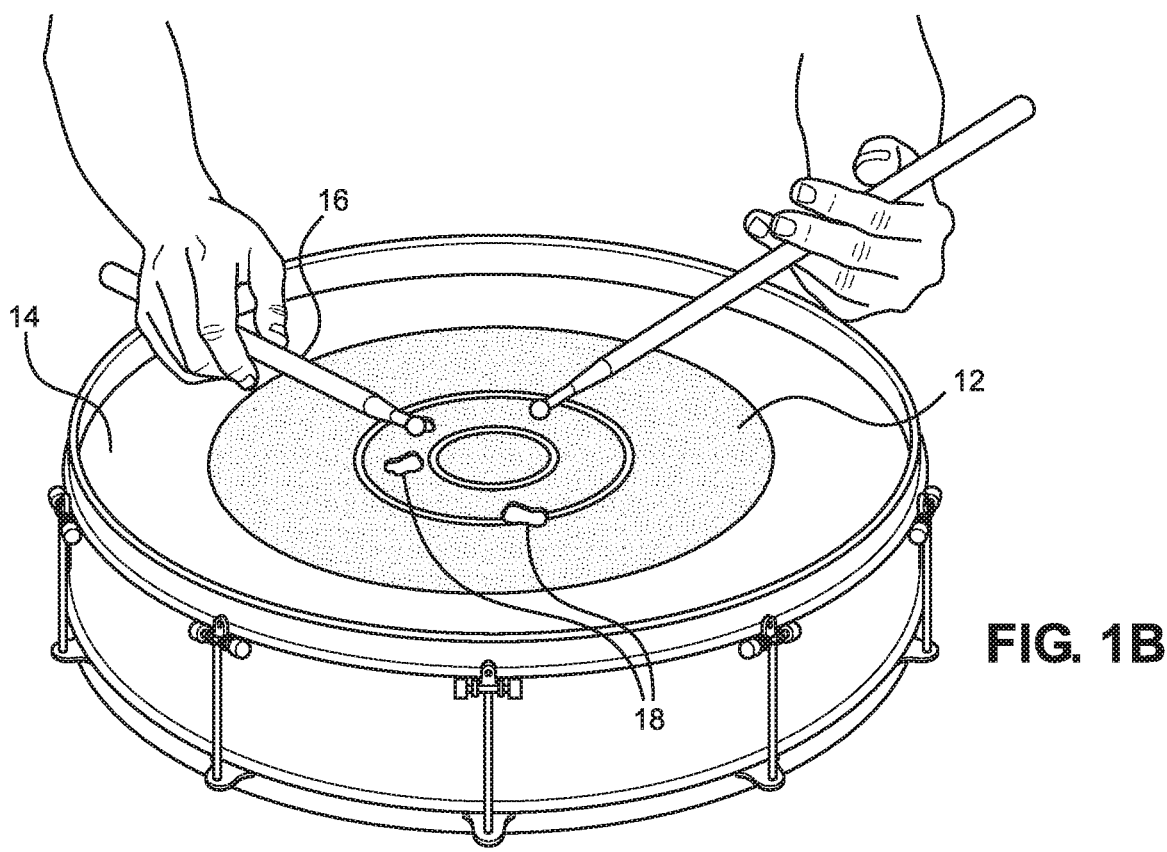
FIG. 1b is an in-use view of the percussion instrument strike training applique with effect.
Figure 2:
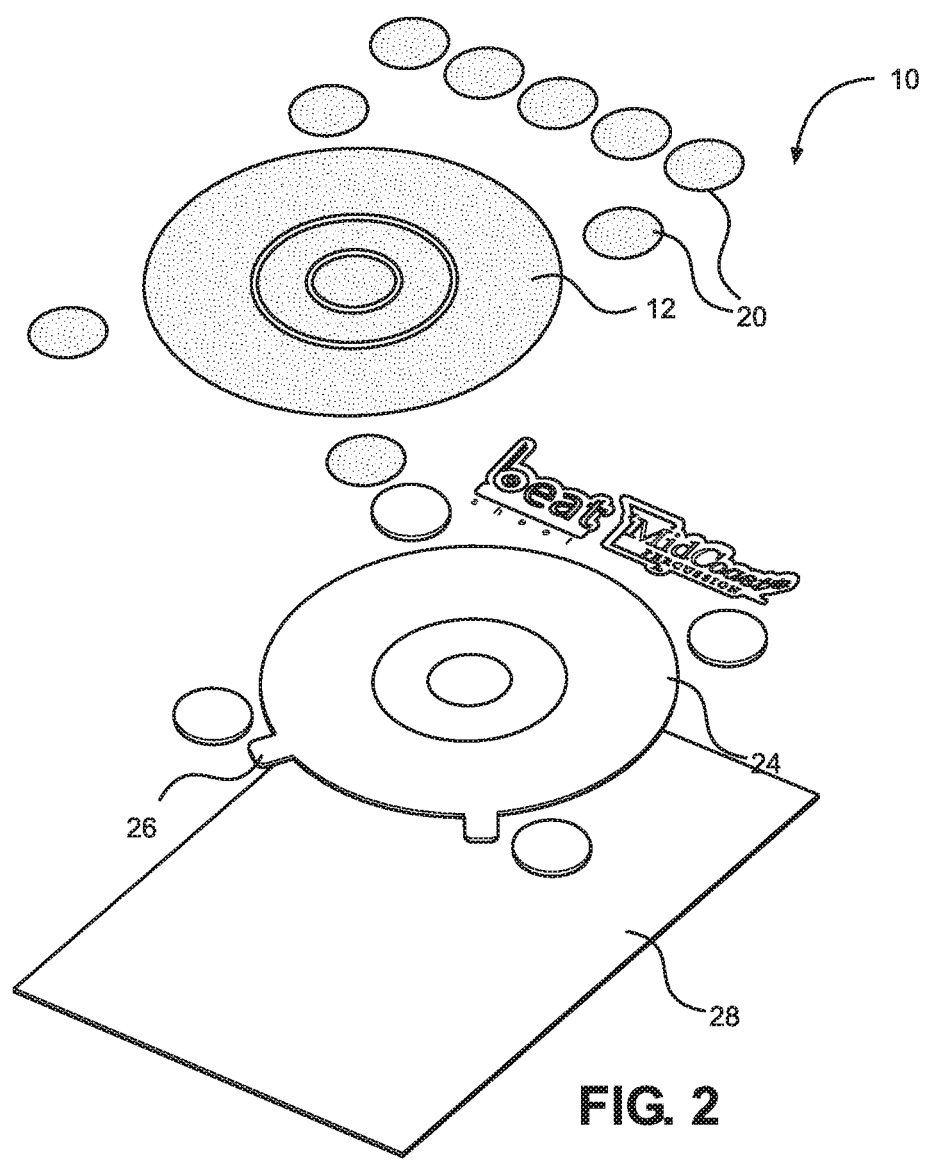
FIG. 2 is an exploded view of the percussion instrument strike training applique.
Figure 3:
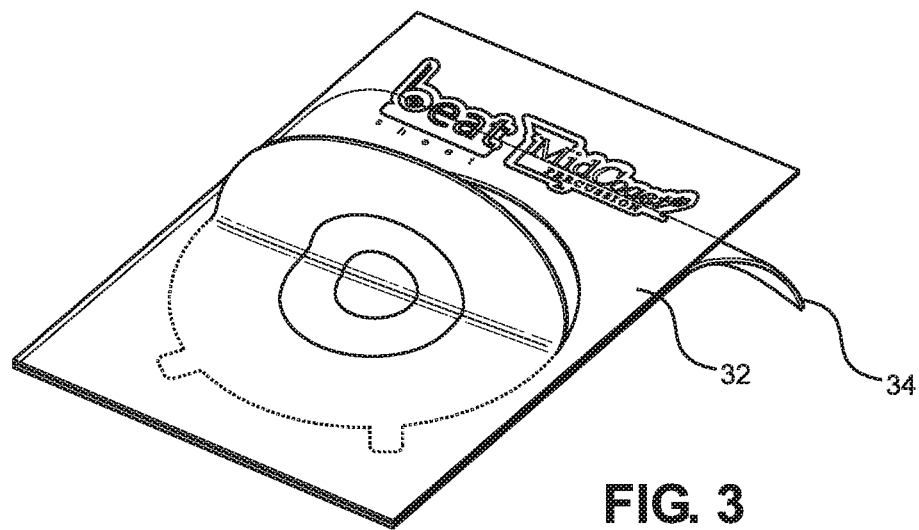
FIG. 3 is a perspective view of the removal sheet.
Figure 5:
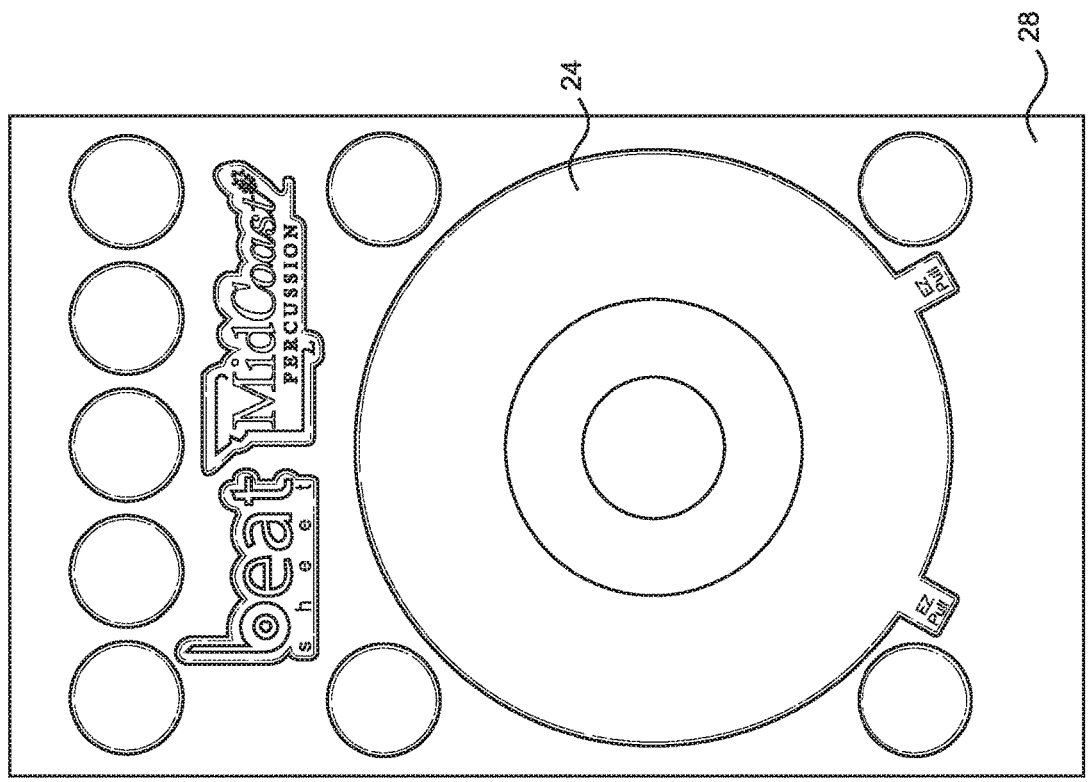
FIG. 5 is a front view of the percussion instrument strike training applique under-layer.
Figure 4:
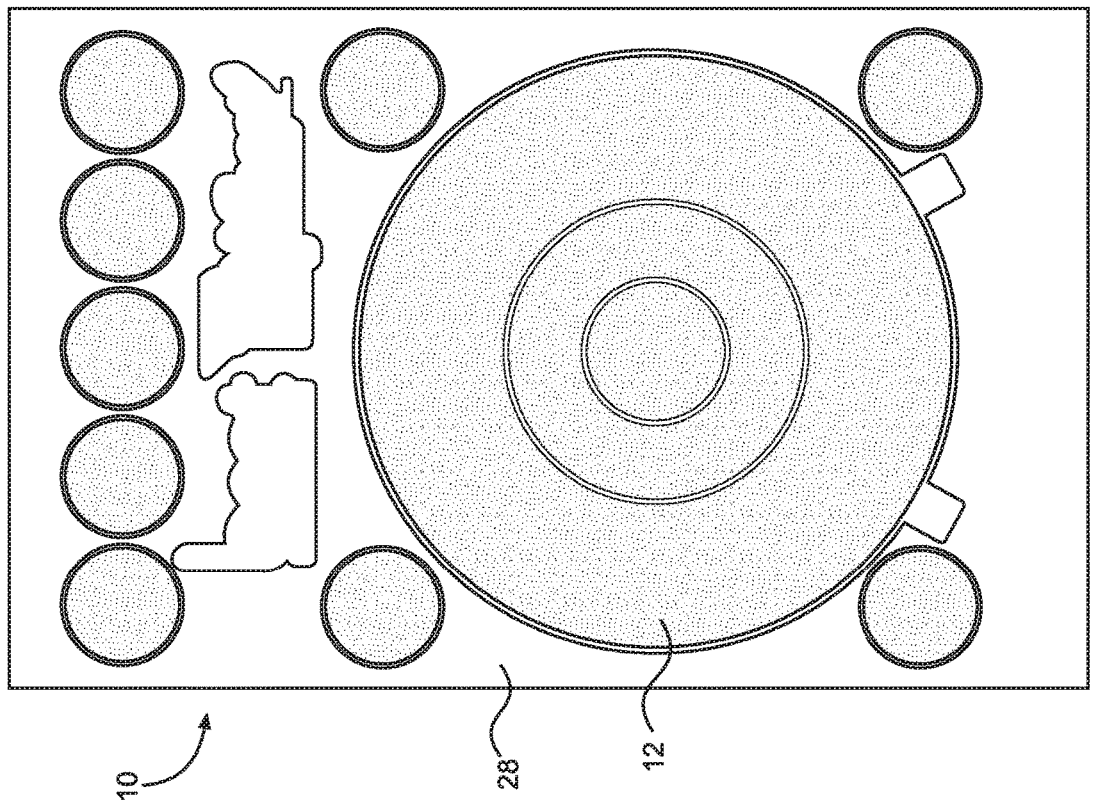
FIG. 4 is a front view of the percussion instrument strike training applique.
Figure 6:
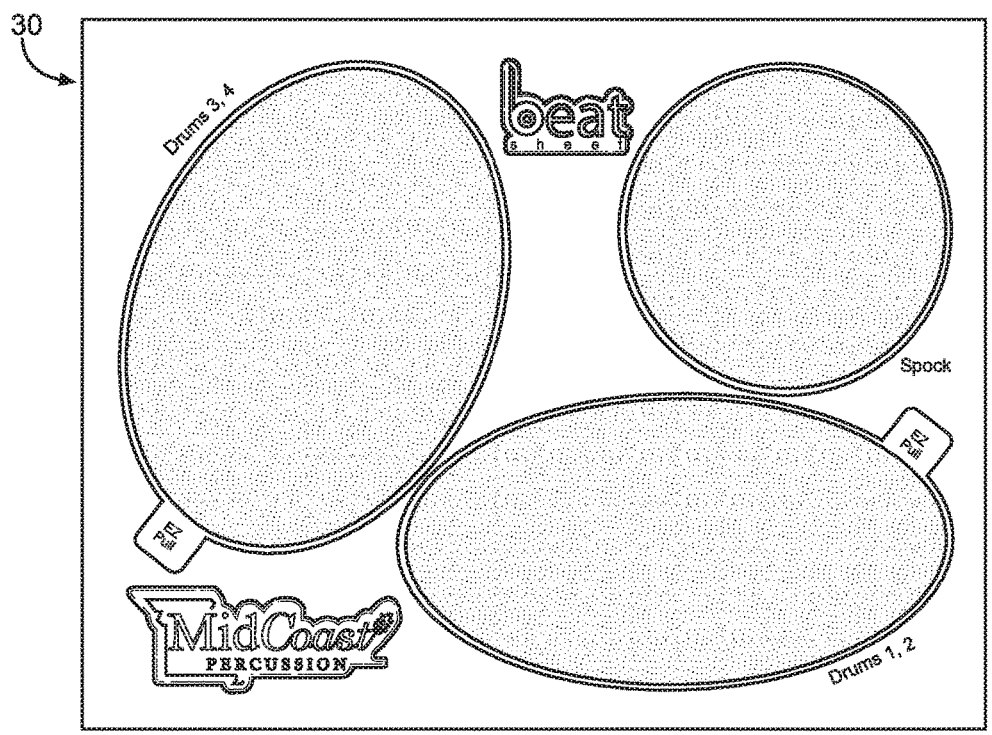
FIG. 6 is an optional embodiment of the percussion instrument strike training applique.
Figure 7:
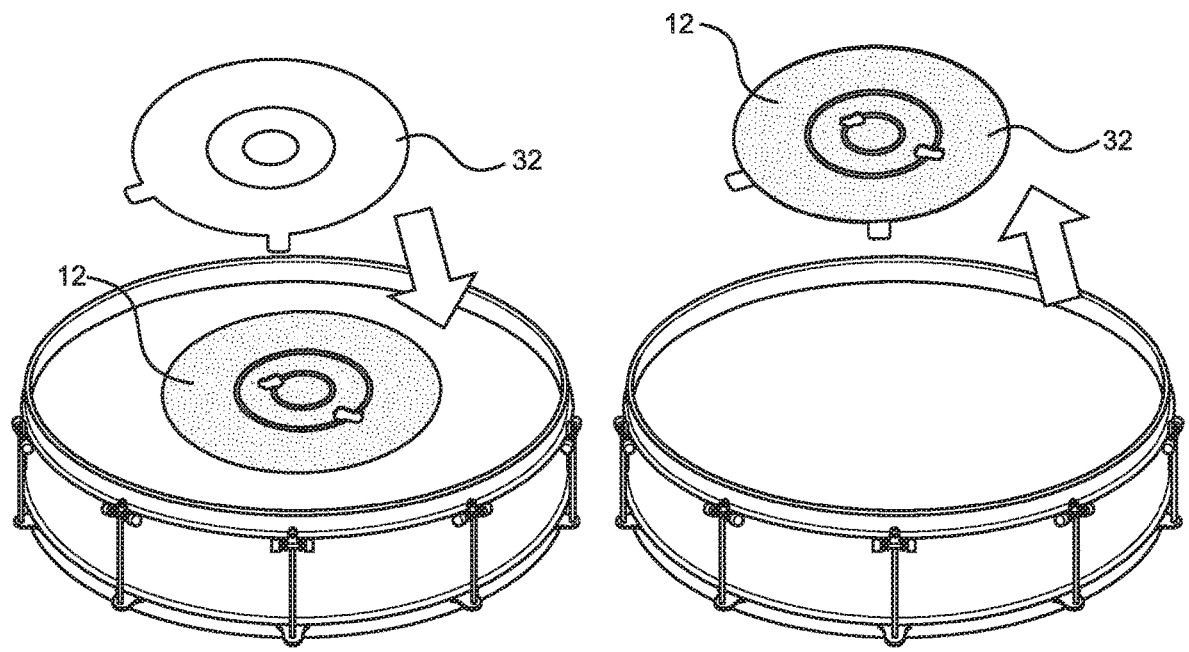
FIG. 7 is a view of the removal sheet in use.

As seen in reference to FIGS. 1 and 2, as the user strikes the striking implement 16 on the striking surface of the percussion instrument 14, a visual feedback indication is provided when the striking implement 16 contacts within the desired strike zone of the percussion instrument. The visual feedback for a properly targeted strike is provided by a detachment 18 of the detachable ink layer 12 from the striking surface of the percussion instrument 14.

The percussion instrument strike training applique 10 is provided as an adhesive sheet that is placed on the playing surface of the percussion instrument 14. Upon impact by the striking implement 16, the detachable ink layer 12 is removed as a detachment 18 revealing a visual indication of the strike point(s), such as by exposure of a colorful sublayer 24. As the surface layer is removed, the relationship of the striking area to the desired ideal playing zone is revealed, thus providing tangible, visual evidence to rectify strike zone inaccuracies.

Prior to the present invention there were few practical methods for receiving tangible evidence of a player contacting the strike zones. The primary source of feedback was in-the-moment observation by player or teacher, which can be easily misinterpreted or dismissed as inconsequential. Direct, in-the-moment observation of striking zones must happen during the act of playing while the brain is busy assessing and accomplishing many complicated tasks. This means that attention cannot be fully focused on any one concept and the aspect of playing zones is commonly one of the first neglected skill sets.

The present invention provides tangible evidence that cannot be dismissed as inaccurate because removal of the detachment 18 provides indisputable proof of the strike location(s) during the player's performance. The percussion instrument strike training applique 10 of the present invention allows players to assess their performance when they are not playing and are free to think critically and make adjustments.

As seen in reference to the drawings of FIGS. 3-7, embodiments of the percussion instrument strike training applique 10 according to the present invention may include a substrate 28 is provided as a detachable paper or film backing layer to which the appliques are retained for use. In some embodiments, a permanent ink layer 24 is provided having an adhesive on a back surface that is releasable from each of the substrate 28 and the instrument strike surface. The permanent ink layer 24 is dimensioned to the desired strike zone of the selected percussion instrument 14, such as shown in reference to FIGS. 4 and 6. The permanent ink layer 24 may include one or more tabs 26 to facilitate removal of the permanent ink layer 23 from the substrate 28 and the striking surface of the percussion instrument 14.

In some embodiments, the permanent ink layer 24 may be formed of a self-adhering plastic film that has surface adhering properties to removably adhere the permanent ink layer to each of the substrate 28 and the instrument strike surface.

The detachable ink layer 12 is applied to a surface of the permanent ink layer 24. The detachable ink layer 12 is applied to a location corresponding to the desired strike zone and may also be applied to one or more target zones surrounding the desired strike zone. In the embodiment shown, the detachable ink layer 12 is applied as concentric rings surrounding the desired strike zone.

Since the desired strike zone should receive significantly more strikes than the area surrounding the desired strike zone, the substrate 28 may also carry one or more replacement patches, each having a permanent ink layer 21 to which a detachable ink layer 20 is applied. The replacement patches may then be applied to the desired strike zone as the detachable ink layer is depleted.

In some embodiments, a removal sheet 32 may also be provided. The removal sheet 32 has an adhesive layer that is applied to the back of the removal sheet 32. In use the adhesive layer of the removal sheet 32 is applied to cover the detachable ink layer 12 on the surface of the percussion instrument 14. As the back of the removal sheet 32 is pressed against the detachable ink layer 12, the remaining detachable ink layer 12 adheres to the adhesive layer of the removal sheet 32. The removal sheet 32 may then be lifted off the striking surface of the percussion instrument 14. The removal sheet 32 prevents additional flaking of the detachable ink layer 12 during removal from the percussion instrument 14. The removal sheet 32 may also include one or more removal tabs.

As will be appreciated, the present invention could be used for other percussion instruments. It should be understood, of course, that the foregoing relates to exemplary embodiments of the invention and that modifications may be made without departing from the spirit and scope of the invention as set forth in the following claims.

What is claimed is:

1. A percussion instrument strike training applique, comprising:
   a substrate layer;
   a permanent ink layer removably adhered to a surface of the substrate layer, the permanent ink layer dimensioned to a strike surface of a percussion instrument; and
   a detachable ink layer applied to a top surface of the permanent ink layer, the detachable ink layer dimensioned to a desired strike zone of the percussion instrument, the detachable ink layer separable from the permanent ink layer when struck by a striking implement of the percussion instrument to provide a visual indicia of an implement strike within the desired strike zone.

2. The percussion instrument strike training applique of claim 1, further comprising:
   an adhesive applied to a bottom surface of the permanent ink layer, the adhesive removable from each of the substrate layer and a striking surface of the percussion instrument.

3. The percussion instrument strike training applique of claim 1, wherein the permanent ink layer is formed of a self-adhering plastic film.

4. The percussion instrument strike training applique of claim 1, wherein the permanent ink layer and the detachable ink layer are of contrasting colors.

5. The percussion instrument strike training applique of claim 1, the detachable ink layer further comprising:
   one or more target zones surrounding the desired strike zone.

6. The percussion instrument strike training applique of claim 5, wherein the one or more target zones comprise one or more concentric rings surrounding the desired strike zone.

7. The percussion instrument strike training applique of claim 1, further comprising:
   one or more tabs protruding from an edge of the permanent ink layer, the one or more tabs provided to facilitate removal of the permanent ink layer from each of the substrate layer and the striking surface of the percussion instrument.

8. The percussion instrument strike training applique of claim 1, further comprising:

one or more replacement patches, dimensioned to cover the desired strike zone.

9. The percussion instrument strike training applique of claim 1, wherein the percussion instrument is a drum.

10. A percussion instrument strike training applique, comprising:
   a permanent ink layer film removably adhered to a surface of a substrate layer, the permanent ink layer dimensioned to a strike surface of a percussion instrument; and
   a detachable ink layer applied to a first surface of the permanent ink layer, the detachable ink layer dimensioned to a desired strike zone of the percussion instrument, the detachable ink layer separable from the permanent ink layer when struck by a striking implement of the percussion instrument.

11. A method for training a strike technique for playing a percussion instrument, comprising:
   applying a percussion instrument strike training applique to a striking surface of the percussion instrument, the percussion instrument strike training applique including a permanent ink layer removably adhered to the striking surface, a detachable ink layer is applied to a first surface of the permanent ink layer, the detachable ink layer dimensioned to a desired strike zone of the percussion instrument; and
   striking the percussion instrument with a striking implement of the percussion instrument.

12. The method of claim 11, further comprising:
   observing a detachment of the detachable ink layer, the detachment produced by an impact of the striking implement within the detachable ink layer.

* * * * *